US012539706B2

(12) United States Patent
Mordechai et al.

(10) Patent No.: US 12,539,706 B2
(45) Date of Patent: Feb. 3, 2026

(54) ADJUSTABLE PRINTING PALLET

(71) Applicant: Kornit Digital Ltd., Rosh HaAyin (IL)

(72) Inventors: Nadav Mordechai, Tel Aviv (IL); Pavel Korolik, Petah Tikva (IL); Ohad Snir, Kiryat-Ono (IL); Harel Yizhak, Rehovot (IL)

(73) Assignee: Kornit Digital Ltd., Rosh HaAyin (IL)

( * ) Notice: Subject to any disclaimer, the term of this patent is extended or adjusted under 35 U.S.C. 154(b) by 273 days.

(21) Appl. No.: 18/269,770

(22) PCT Filed: Dec. 23, 2021

(86) PCT No.: PCT/IL2021/051529

§ 371 (c)(1),
(2) Date: Jun. 27, 2023

(87) PCT Pub. No.: WO2022/144874

PCT Pub. Date: Jul. 7, 2022

(65) Prior Publication Data

US 2024/0316957 A1 Sep. 26, 2024

Related U.S. Application Data

(60) Provisional application No. 63/132,544, filed on Dec. 31, 2020.

(51) Int. Cl.
*B41J 11/06* (2006.01)
*B41J 3/407* (2006.01)

(52) U.S. Cl.
CPC .............. *B41J 11/06* (2013.01); *B41J 3/4078* (2013.01)

(58) Field of Classification Search
CPC ......... B41J 11/06; B41J 11/20; B41J 11/0035; B41J 3/4078; B41J 3/28; B41J 13/22;
(Continued)

(56) References Cited

U.S. PATENT DOCUMENTS 6,439,370 B1 * 8/2002 Hoffman, Jr. ...... A41H 43/0235 198/502.1
6,640,714 B1 11/2003 Papa
(Continued)

FOREIGN PATENT DOCUMENTS

CN 108349267 7/2018
CN 111114113 5/2020
(Continued)

OTHER PUBLICATIONS

International Search Report and the Written Opinion Dated Mar. 31, 2022 From the International Searching Authority Re. Application No. PCT/IL2021/051529. (11 Pages).
(Continued)

*Primary Examiner* — John P Zimmermann

(57) ABSTRACT

An adjustable pallet for digital printing comprises a flat printing surface having a flatness tolerance and a parallelism tolerance, the printing surface formed by at least two separable portions, which portions are configured to separate and re-engage while retaining said flatness tolerance and said parallelism tolerance. The tolerance may be maintained by using a defined mechanical path for moving the portions.

16 Claims, 11 Drawing Sheets

(58) Field of Classification Search

CPC ....... B41J 11/02; B41J 11/0022; B41J 11/007; B41J 25/3086; B41J 25/308; B41J 3/4073; B41F 15/18; B41F 17/005; B65H 2701/174; B66F 7/025; B29C 64/232; B23D 47/025

See application file for complete search history.

(56) References Cited

U.S. PATENT DOCUMENTS

| | | | | |
|---|---|---|---|---|
| 8,256,889 | B1 | 9/2012 | Abbott et al. | |
| 9,259,944 | B2 * | 2/2016 | Moriya | B41J 11/20 |
| 9,821,574 | B2 * | 11/2017 | Fujimori | B41J 3/4078 |
| 2009/0293743 | A1 | 12/2009 | Kim | |
| 2015/0107467 | A1 * | 4/2015 | Hoffman, Jr. | B41M 1/26<br>101/126 |
| 2016/0346850 | A1 * | 12/2016 | Cox | B23D 47/025 |
| 2018/0370258 | A1 | 12/2018 | Hoffman, Jr. | |
| 2019/0381808 | A1 * | 12/2019 | Friedrich | B41J 11/20 |
| 2020/0307277 | A1 * | 10/2020 | Snir | B41J 3/4078 |
| 2022/0001613 | A1 * | 1/2022 | Chapman | B29C 64/232 |
| 2023/0191807 | A1 * | 6/2023 | Korolik | B41J 3/4078<br>400/648 |

FOREIGN PATENT DOCUMENTS

| | | |
|---|---|---|
| CN | 211390625 | 9/2020 |
| JP | 2013-022858 | 2/2013 |
| JP | 2020-083558 | 6/2020 |
| WO | WO 2017/044045 | 3/2017 |
| WO | WO 2022/144874 | 7/2022 |

OTHER PUBLICATIONS

Supplementary European Search Report and the European Search Opinion Dated Nov. 11, 2024 From the European Patent Office Re. Application No. 21914866.5. (40 Pages).

International Preliminary Report on Patentability Dated Jul. 13, 2023 From the International Bureau of WIPO Re. Application No. PCT/ IL2021/051529 (7 Pages).

Notification of Office Action and Search Report Dated Jul. 19, 2025 From the State Intellectual Property Office of the People's Republic of China Re. Application No. 202180088891.9 and Its Machine Translation into English. (14 Pages).

* cited by examiner

Length Adjusted
Collar 22
17"
430 mm
130mm
40mm
50mm
16" (Standard) Width
406 mm
11" (Children) Width
278 mm
13" (Mid) Width
330 mm
10
12
14
16
18
20
22
24
26
28
30
32

Both Segments Raised Together

Only Inner Segments Raised

PALLET ADJUSTABLE WIDTH

11" (Children) Width
278 mm

13" (Mid) Width
330 mm

16" (Standard) Width
406 mm

ADJUSTABLE PRINTING PALLET

RELATED APPLICATION/S

This application is a National Phase of PCT Patent Application No. PCT/IL2021/051529 having International filing date of Dec. 23, 2021, which claims the benefit of priority under 35 USC § 119(e) of U.S. Provisional Patent Application No. 63/132,544 filed on Dec. 31, 2020. The contents of the above applications are all incorporated by reference as if fully set forth herein in their entirety.

RELATED APPLICATION/S

This application claims the benefit of priority of U.S. Provisional Patent Application No. 63/132,544 filed on 31 Dec. 2020, the contents of which are incorporated herein by reference in their entirety.

FIELD AND BACKGROUND OF THE INVENTION

The present invention, in some embodiments thereof, relates to a pallet and, more particularly, but not exclusively, to a holding or feeding pallet for a digital textile printing machine.

In order to print on a garment, the garment needs to be held taut and level. Thus a feed structure that includes a tray to provide a surface and a frame to hold the garment in position on the tray, is generally used. Garments come in different shapes and sizes so that not all pallets are suitable for all garments. A pallet for a textile printing machine is typically big and heavy, and not easy for operators to manipulate. That is to say it may be challenging for operators to change the pallet over in order to print a different garment size or kind of garment or other textile product. Nevertheless, it is generally necessary to have a pallet that is correct for the size or shape of the garment etc., and exemplary digital textile printers print digitally on garments that are loaded manually on pallets, according to their type, so that there are specialized pallets for shirts, bags, sleeves, hoodies, etc. all of assorted sizes. Therefore, there is a constant need to change pallets on the printer, to support all different applications. Thus a change of pallet may be needed for different garment sizes, such as baby garments, child garments, adult garments, overalls, and even tote bags and other textile based accessories. The pallet may typically weigh more than 10 kg and thus changing the pallet for different sizes or shapes of garment takes time and not all operators may physically be up to the task.

Current pallet solutions are typically standalone pallets in which each of the pallets contains all the technical systems needed for its operation. Examples of such included technical systems are the gas-springs, safety latch, open/close latch, open/close handle, magnets, hinges, etc.

The result is that the pallet contains many complex parts, with high cost and high weight. All the above-mentioned mechanical features are part of the pallet and every time a different sized garment is printed, the pallet needs to be removed and replaced with a different pallet. A range of sizes and shapes of pallet are provided with the machine and more specialized sizes and shapes may have to be ordered and manufactured separately.

The all-in-one concept is thus not scalable or modular and not accurate enough for the printer's requirements. There are many interchangeable parts to support all applications; the combination of parts required for each application is relatively complicated and not all applications can be achieved by all-in-one pallets as supplied, thus limiting the usability of the machine.

Furthermore, the design of the pallets is strongly connected with the ergonomics of the printer so that a redesign of the pallet is a long term project, and the pallet is a long-term part for the printer.

U.S. Pat. No. 7,765,927 discloses a platen for use in printing which uses sections that the operator is able to insert in order to manually increase the flat operating area of the platen. The device is not automated and thus is believed to lack the necessary precision. U.S. Pat. No. 6,640,714 discloses a pallet that is adjustable along its width to specifically accommodate a wide range of differently sized pieces of clothing. A main pallet base is flanked by a pair of extendable and retractable wings that extend simultaneously on either side.

US Patent Application No. 2018/0370258 discloses a textile pallet with an adjustable frame to enable adjustment of the width of the pallet for facilitating centering of larger than typical textiles on the pallet.

The adjustable frame does not however guarantee a sufficiently flat surface to allow for digital printing and indeed state of the art digital printing requires the flatness of the pallet to be to an accuracy of some 0.25 mm, and separately requires the surface to be parallel to the print heads to an accuracy of 0.1 mm over the length and breadth of the pallet.

SUMMARY OF THE INVENTION

The present embodiments relate to pallets which may change size, either manually or automatically, to accept different sized garments for printing, while maintaining the necessary degree of flatness. A continuous flat surface is provided for printing, but the size of the surface may be altered. One embodiment inserts inner sections between sliding outer sections. Another embodiment has wings that may be removed outwardly and a third embodiment has folding wings. All three systems are automated to provide the necessary tolerance levels for digital printing, and the pallet adjustment may be entered by the operator for individual printing, or may be supplied digitally, for example along with the print map, so that both the printer and pallet are set digitally for the incoming print job.

According to an aspect of some embodiments of the present invention there is provided an adjustable pallet for digital printing comprising:

a flat printing surface having a flatness tolerance and/or a parallelism tolerance, the printing surface formed by at least two separable portions, which portions are configured to separate and re-engage while retaining the flatness tolerance and/or the parallelism tolerance.

In an embodiment, the flatness tolerance is less than 1 mm and/orthe parallelism tolerance is less than 0.25 mm.

In an embodiment, the flatness tolerance is 0.25 mm and/or the parallelism tolerance is 0.1 mm.

Embodiments may comprise at least one mechanical path through which the at least two separable portions are guided to allow for the separating and reengaging.

In an embodiment, the mechanical path is a rotary path, there being at least three separable portions of which one is stationary and the other two are rotatable.

In an embodiment, the mechanical path is linear, there being at least three separable portions, of which one is stationary and the other two are linearly slidable. The linear and rotary mechanical paths may be combined together so that an embodiment may provide linear paths for some of the panels and rotary paths for others. Each panel may have its own independent mechanical paths or some panels may have related paths. Thus in one case two outer panels may have different rotary paths but be mechanically connected to rotate together in opposite senses.

In an embodiment, the at least one mechanical path comprises linear paths, there being at least three separable portions, at least two being linearly slidable in a plane of the flat printing surface and at least one of the separable portions being slidable perpendicularly from the flat printing surface.

In an embodiment, the separable portions comprise at least two outer portions being slidable in the plane and inner portions being slidable perpendicularly, the inner portions being configured to slide underneath the outer portions to form a relatively smaller pallet and to emerge to form a contiguous surface with the outer portions to produce a relatively larger pallet.

In an embodiment, the inner portion comprises a central part and two surrounding portions, the central part configured to slide independently of the surrounding portions, thereby to form a relatively large pallet with outer portions, the inner part and the surrounding portions, a relatively medium pallet with the outer portions and the central part and a relatively small pallet with the outer portions only.

In an embodiment, the separable portions are pushed together by action of tensioning means.

In an embodiment, the separable portions comprise pins and corresponding sockets for location with each other.

The pallet may comprise a collar end over which garments are slid onto the pallet, and sliders for sliding the separable portions. The sliders may be at a distance from the collar end which is at least a length of a largest garment for which the pallet is suited.

Likewise, the pallet may have a collar end over which garments are slid onto the pallet, and holders for holding the separable portions in position, wherein the holders contact the separable portions at a distance from the collar end, which distance is at least a length of a largest garment for which the pallet is suited.

Embodiments may comprise a stretching element for stretching a garment from underneath the pallet, the stretching element being placed on a slider on which at least one of the separable portions is slidable.

According to a second aspect of the present invention there is provided a method of printing different sized garments comprising:

obtaining a first size of a first garment to be printed;

moving panels together or apart via defined mechanical paths to form a flat surface for a printing pallet;

placing the garment on the printing pallet;

printing the garment;

obtaining a second size of a second garment to be printed;

if the second size is significantly different from the first size then rearranging the panels via the define mechanical paths to form a flat surface of an adjusted pallet suitable for the second size; placing the second garment on the adjusted pallet; and printing the garment.

According to a third aspect of the present invention there is provided an adjustable pallet for digital printing comprising:

a flat printing surface having a flatness tolerance and/or a parallelism tolerance, the printing surface formed by at least two separatable portions, which portions are configured to separate and re-engage using predefined mechanical paths, thereby retaining the flatness tolerance and/or the parallelism tolerance.

In an embodiment, the flat printing surface has both of the flatness tolerance and the parallelism tolerance.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figures 1A, 1B, 1C:
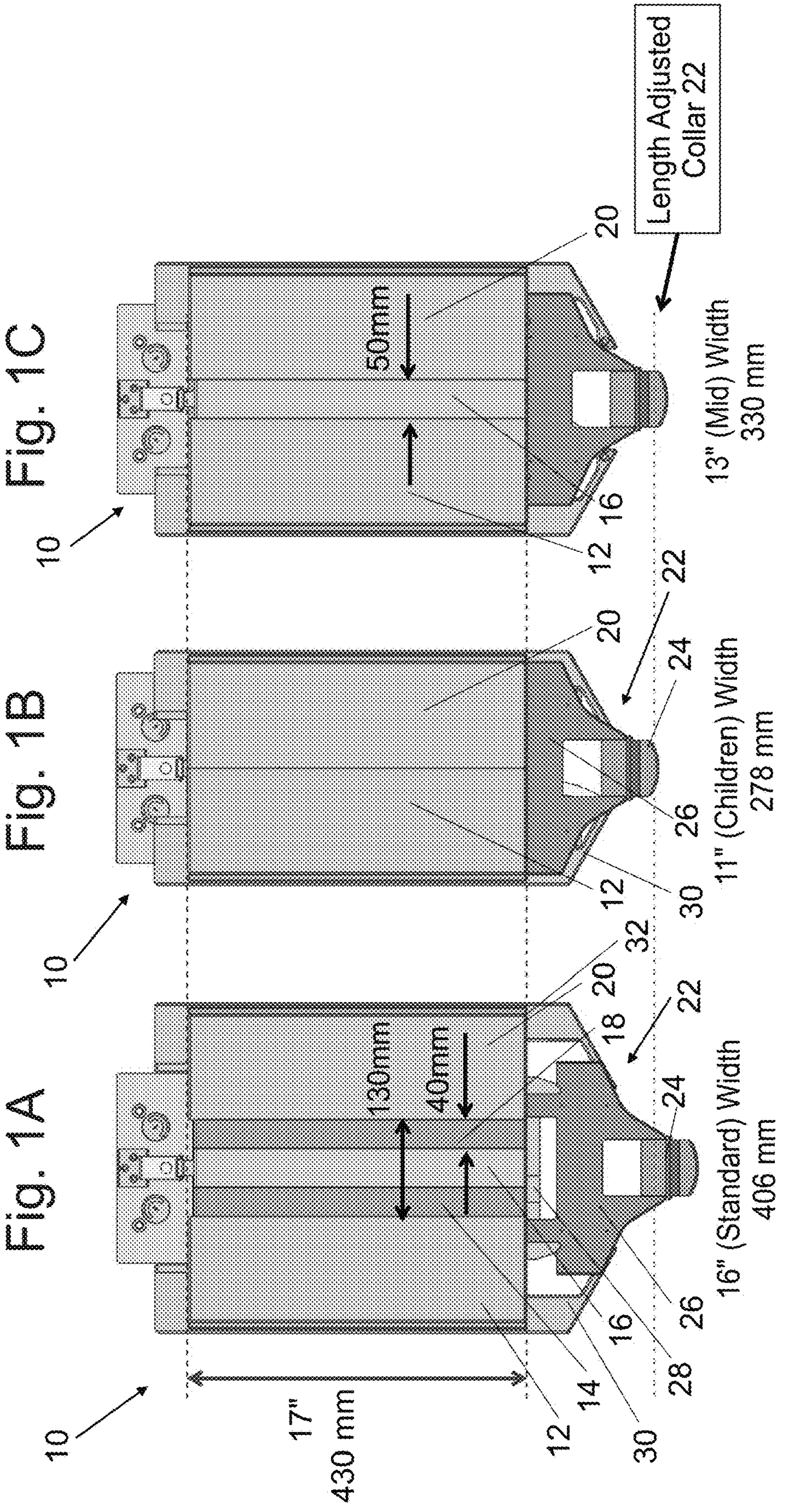
FIGS. 1A to 1C are simplified views showing an adjustable pallet according to a first embodiment of the present invention in three different states of adjustment.

The present invention, in some embodiments thereof, relates to an adjustable pallet for digital printing of textiles and garments and, more particularly, but not exclusively, to a pallet that includes automated adjustment of the flat printing surface while guaranteeing the high levels of tolerance needed for digital textile printing.

In printing process of garments such as T-shirts or cut fabric pieces, pallets are used for obtaining a flat surface for flattering the fabric without leaving wrinkles. Loading a small garment on a fixed size pallet may be too small for it to fit and a smaller pallet may be needed. An attempt to load a large garment on a small pallet may cause straightness and position issues causing an inaccurate placement of the printed art.

The present embodiments are intended to remove the need for replacement of a complete pallet for adjusting to a garment size. System throughput may be increased as pallet width is automatically and quickly altered to the width size. Machine cost may be reduced as a mechanism enables a single pallet to serve in place of three or more different sizes on a single pallet infrastructure. As well as improvements in operation, the resulting reduction in the number of pallets leads to a significant reduction in necessary storage space, since pallets are large, and a reduction in the amount of maintenance, since there is less to maintain.

More particularly, printing on garments requires proper positioning of the garment relative to the printing head, and it is the primary function of the printing pallet, which holds the garment during printing to properly position the surface of the garment. There are different sizes of garments, what requires using of corresponding different sizes of printing pallets. Replacement of printing pallet is a complicated task, and the cost of such printing pallet is relatively high.

A multi size pallet instead may be capable of dealing with a wider range of garment sizes without the need to replace a complete fixed size pallet. A pallet may thus be made up of portions or panels that together make up a flat surface, wherein the panels may be separated and put back together again in such a way as to maintain a very high tolerance level. The high tolerance level may be obtained by using a well-defined mechanical path for each of the panels to follow, such as a linear path, or a rotary path. In one embodiment, the flat surface may be made of multiple panels, each mounted on a mechanism that defines a linear path for the panel. In order to reduce the width, some of the panels are withdrawn downwards in a vertical linear path and the remaining panels move sideways in a horizontal linear path to fill in the vacated space. Depending on the number of panels, any number of different widths may be achieved. Herein by way of example a five panel variant is shown.

In a second embodiment, a multi-size pallet may change its width by revolving a cross section triangle segment, that is to say, two outer panels have rotary paths and an inner panel is stationary. The revolving action of the triangle may be initiated manually or automatically although a mechanical mechanism may be provided to ensure that the resulting increased pallet surface has the required tolerance for digital printing.

In a third embodiment, a loading method stretches a garment such as a T-shirt on a multi size pallet using stretching bars. The pallet changes its size by adding or decreasing arms or segments that can slide in and out while the required clearance needed for loading a garment. That is to say a central panel is stationary and outer panels have horizontal linear paths. The garment is stretched and fixed to the pallet by the next extension of the pallet itself or by a dedicated stretching bar that slides underneath the plate.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now to FIG. 1, which illustrates three views, FIG. 1A—standard width, FIG. 1B—children's width and FIG. 1C—intermediate width, of a first embodiment of the present invention in which a pallet 10 comprises a flat upper surface made up of multiple panels. In FIG. 1A, five panels, 12, 14, 16, 18 and 20 make up the surface. Each panel is mounted on a mechanism so as to be able to move. The three central panels 14, 16 and 18 are mounted on mechanisms that draw them up and down and the two outer panels 12 and 20 are on mechanisms that draw them sideways. In order to reduce the width, one or more of the panels are withdrawn downwards and the remaining panels move sideways to fill in the vacated space. FIG. 1B shows the situation where the second, third and fourth panels 14, 16 and 18 have been withdrawn to provide a minimal width. FIG. 1C shows the situation where the second and fourth panels have been withdrawn but the third panel 16 remains, thus providing the intermediate width. Depending on the number of panels, any number of different widths may be achieved, say for example to give more children's sizes or more adult sizes. The five panel variant shown herein is merely by way of example.

The pallet further includes a length adjusted collar 22. The length adjusted collar comprises endpiece 24 which sides on the end of main collar part 26. Main collar part 26 slides outwardly from the pallet on sliding part 28. Collar wings 30 and 32 are slidably arranged between the collar main part 26 and outer pallet panels 12 and 20 so that as the pallet opens and the collar main part slides outwardly, the collar wings slide outwardly to take up the increased width. Accordingly length adjusted collar is at its greater extent in the scenario in FIG. 1A and at its smallest extent in FIG. 1B.

Figure 2:
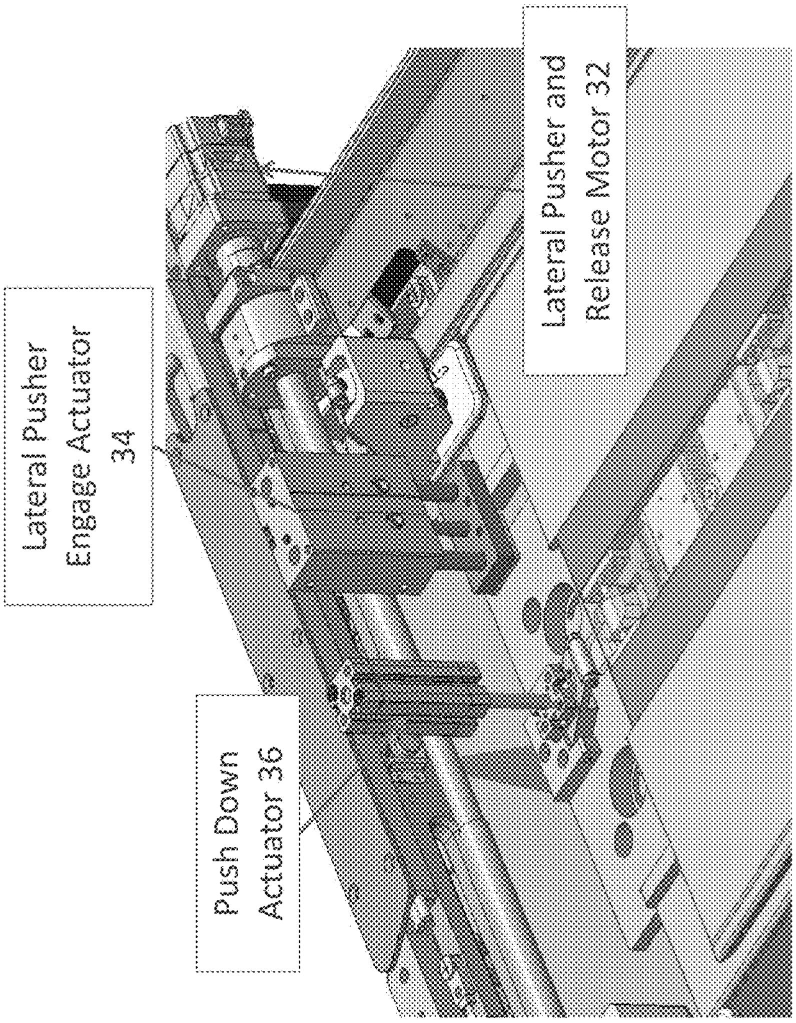
FIG. 2 is a simplified diagram that illustrates actuators for operating the adjustable pallet of FIGS. 1A to 1C.
Figure 2:
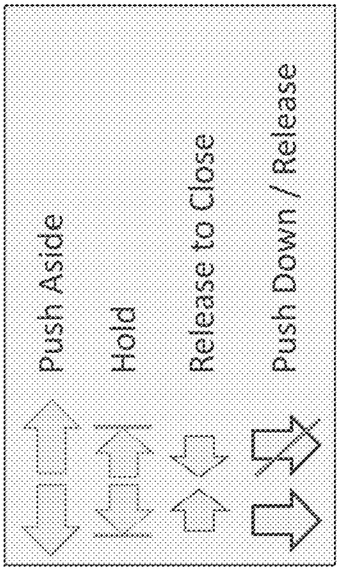

Reference is now made to FIG. 2, which is a simplified view showing the mechanism 30 for operating the panels or segments in FIG. 1A to C. A lateral push and release motor 32 operates lateral push and engage actuator 34 to engage and push the outer panels 12 and 20 to move outwardly. In one embodiment a spring mechanism may be used to push the outer panels back to the central position whenever they are released and the middle panels are removed.

Push down actuator 36 operates to lower the central panels 14, 16 and 18 when they are not required. The actuators may be pneumatically operated or operated by electrical motors or by any other suitable method. A loader stage may axially position the pallet with respect to the actuators, and a laterally positioned gripper screw may be used for precise lateral positioning.

Figure 3C:
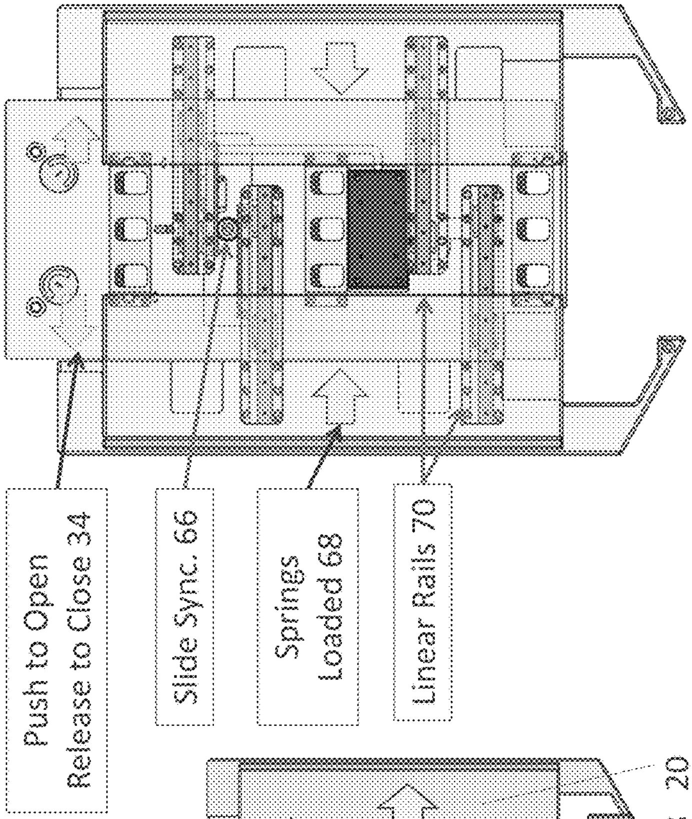
FIGS. 3A to 3C are simplified cutaway views showing an adjustable pallet according to the embodiment of FIG. 1A to C in three different states of adjustment.
Figure 3B:
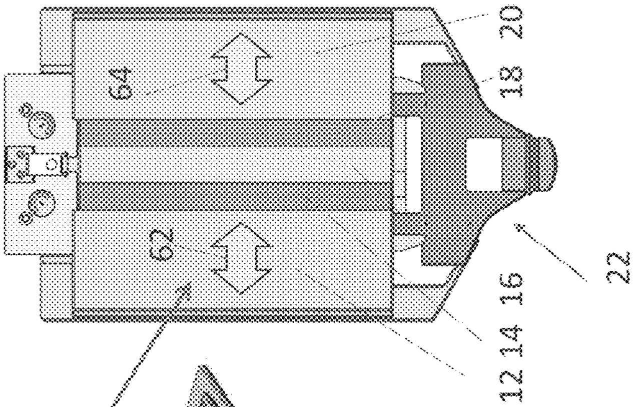
Figure 3A:
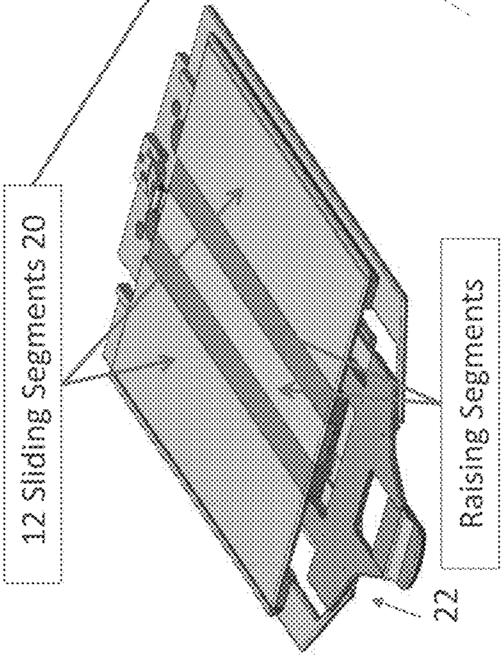

FIG. 3A shows the sliding panels 12 and 20 and the rising panels 14, 16 and 18, from a perspective view. FIG. 3B shows the same view from above with arrows 62 and 64 to illustrate the sliding directions. FIG. 3C is a cutaway view from above and shows the open and release actuator 34, synchronized slider 66 that works to slide both outer panels 12 and 20 together, ensuring mechanically that precise tolerances are maintained. Spring loaded return mechanism 68 ensures that the outer panels are returned to the center of the table when the inner panels are removed. Linear rails 70 support the side to side motion of the sliding panels 12 and 20.

Figure 4B:
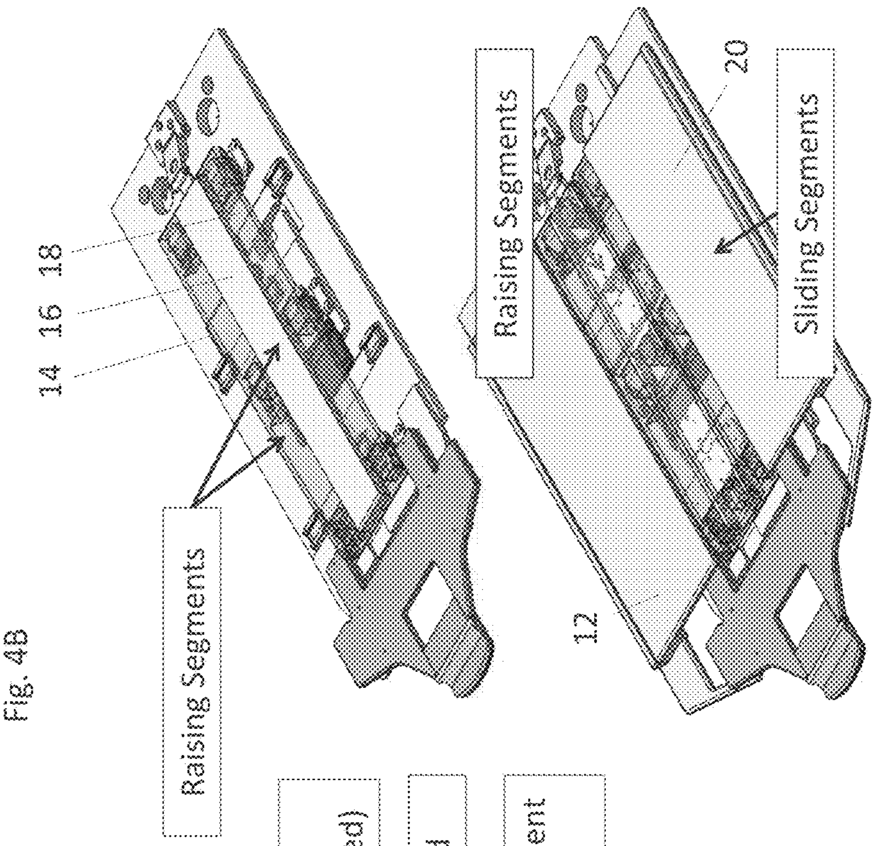
FIGS. 4A and 4B are cutaway views of the adjustable pallet of FIGS. 3A and 3B at different stages of adjustment.
Figure 4A:
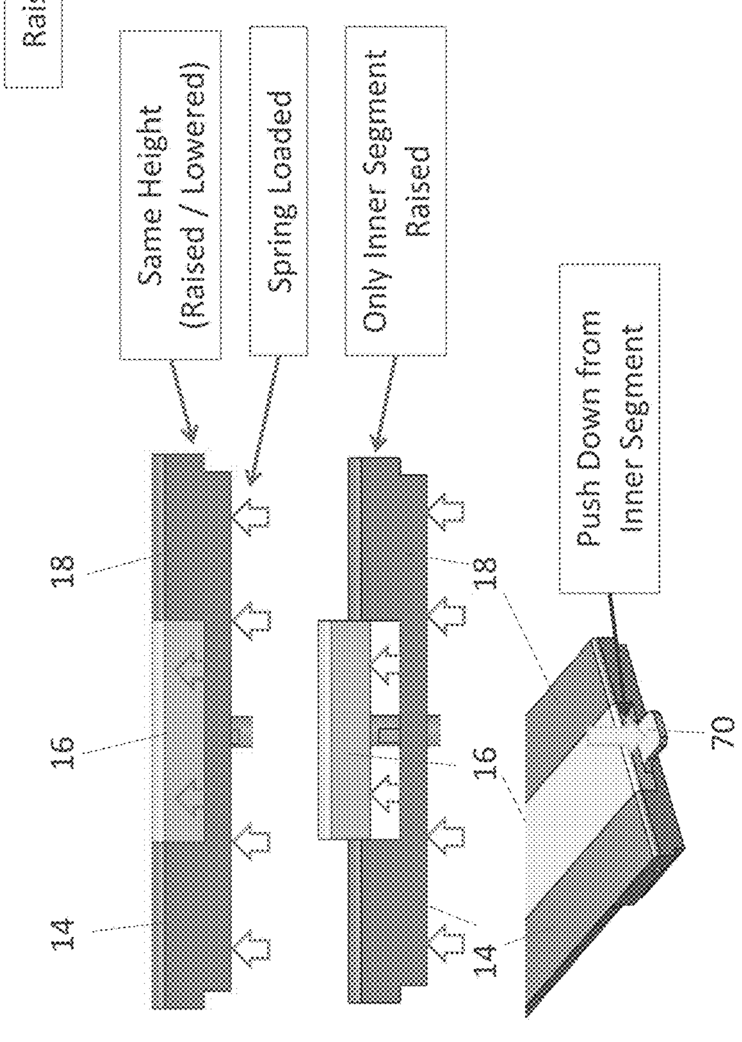

FIGS. 4A and 4B illustrate the raising and lowering mechanisms and the inner panels 14, 16 and 18. In FIG. 4A top, all three panels are raised. In FIG. 4A middle only the central panel 16 is raised. In FIG. 4A lower, all three panels 14, 16 and 18 are lowered. A push down lever 70 allows the middle panel 16 to be lowered when the surrounding panels are already lowered. FIG. 4B shows the rising segments 14, 16 and 18 located in between sliding segments 12 and 20.

Figure 5A:
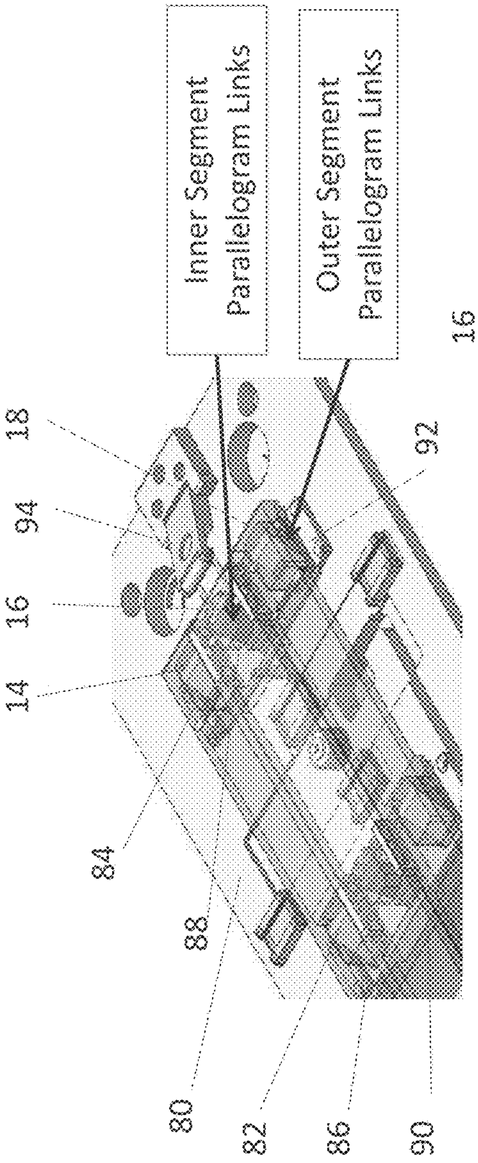
FIGS. 5A to 5C are three cutaway views showing actuation features for achieving the adjustments shown in FIG. 3A-C.
Figure 5B:
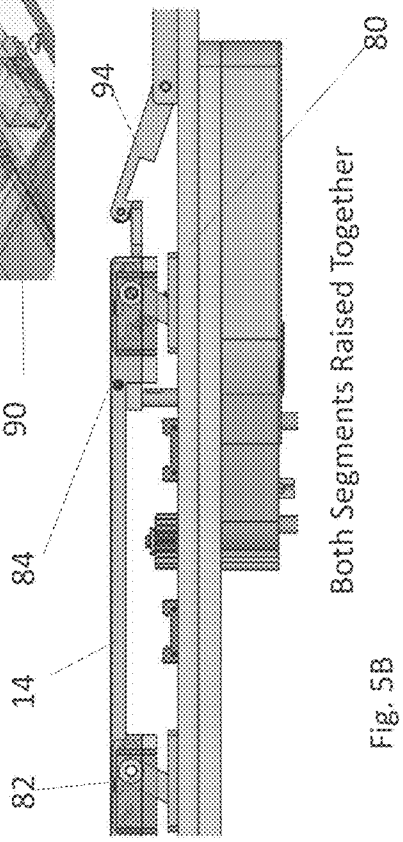
Figure 5C:
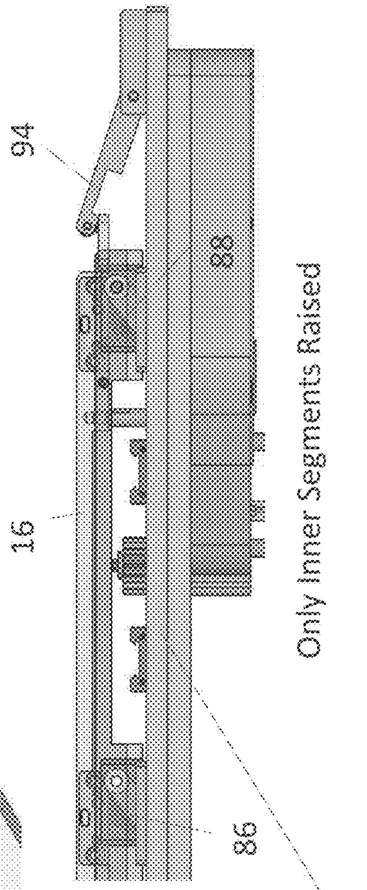

Reference is now made to FIGS. 5A-5C, which show a parallelogram mechanism for raising the three central panels. FIG. 5A is a cutaway perspective view showing the parts of the parallelogram. An inner parallelogram may work to raise the middle panel 16 independently from the other two, 14 and 18, which are separately raised by an outer parallelogram. The panels themselves are the upper face of a parallelogram which is made up of base 80 and upper and lower pivoted levers, 82 and 84 for panel 14, 86 and 88 for panel 16 and 90 and 92 for panel 18. FIG. 5B shows all three panels raised together and FIG. 5C shows the inner panel 16 raised alone. Latch 94 latches the parallelograms in the upper position.

Figures 6A, 6B:
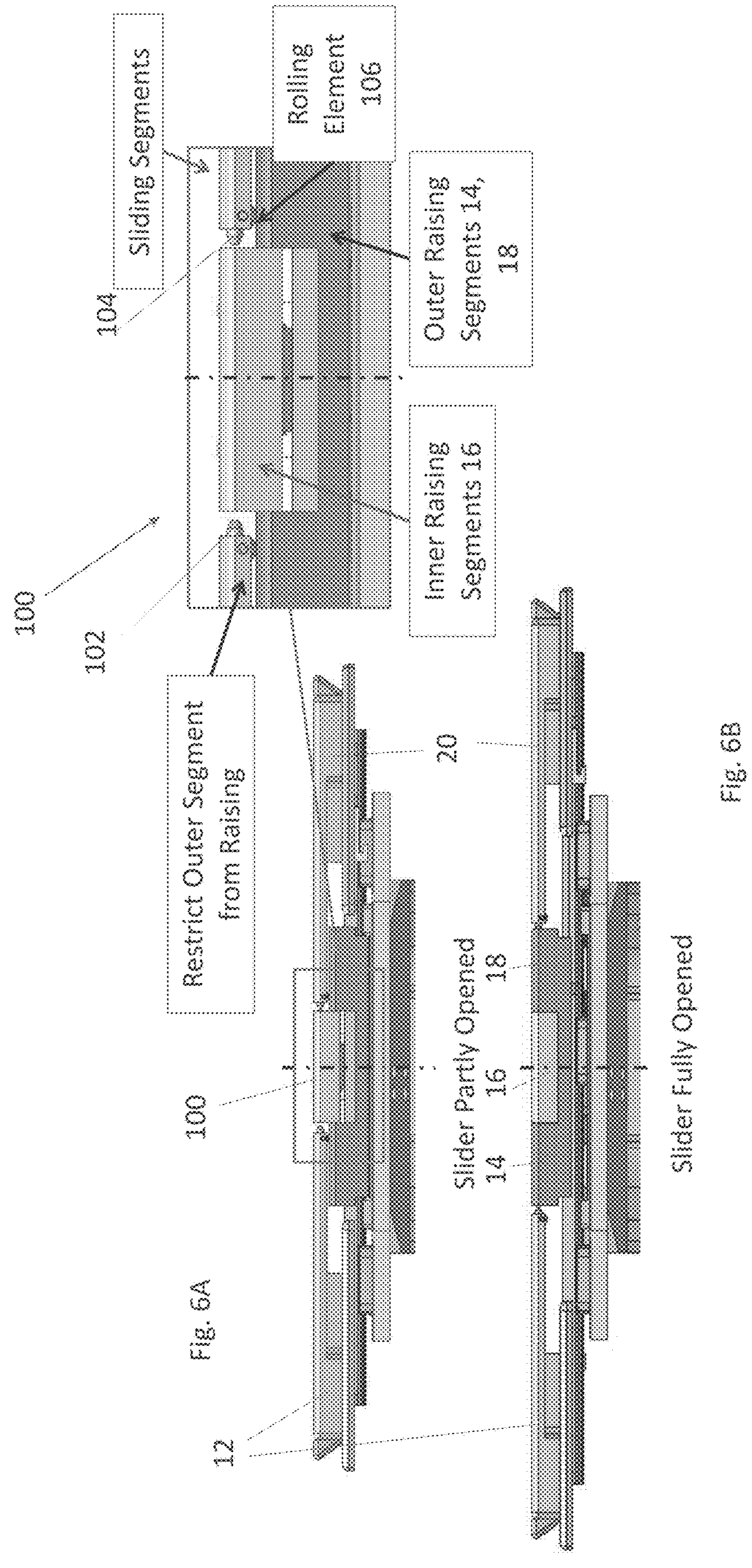
FIGS. 6A and 6B are three end cutaway views illustrating the adjustments of FIG. 3A-C.

Reference is now made to FIGS. 6A & 6B, which illustrate how the rising panels 14, 16 and 18 are controlled by the positions of the sliding panels 12 and 20. As the sliding panels 12 and 20 are slightly opened, the middle panel 16 is able to rise as shown in insert 100. As the sliding panels are fully opened, the further out panels 14 and 18 are able to rise to form the maximum size table. Engagement pins 102 and 104 fit into corresponding sockets on either the inner or outer rising panels to ensure precise fitting. Rollers or rolling elements 106 may ensure smooth travel of the sliding panels over the rising panels.

In general, the system of the present embodiments may comprise two parts, the adjustable pallet itself and an actuator part. In embodiments, the actuator is separated from the pallet part in order to reduce cost of multi-pallet platforms, as well as to avoid exposing of actuators to the aggressive process chemicals. However, the actuators may also be built-in to the printing pallet.

The pallet has 3, 5 or more segments that may move either to slide along the printing surface direction or may move in a perpendicular direction. The segments are aligned together form the printing table, and adding more segments increases the printing area. The segments may be added automatically by the actuator as described above although they could also be inserted manually, with a view to meeting the tolerance requirements for digital printing.

The system may support variable sizes of flexible rising panels. Furthermore, separate mini-panels may be provided to provide the different levels needed to support thicker parts of the garment such as pockets, zippers etc.

The pallet may include various garments tension mechanisms in addition to or instead of the tension flaps described hereinabove.

Figure 7A:
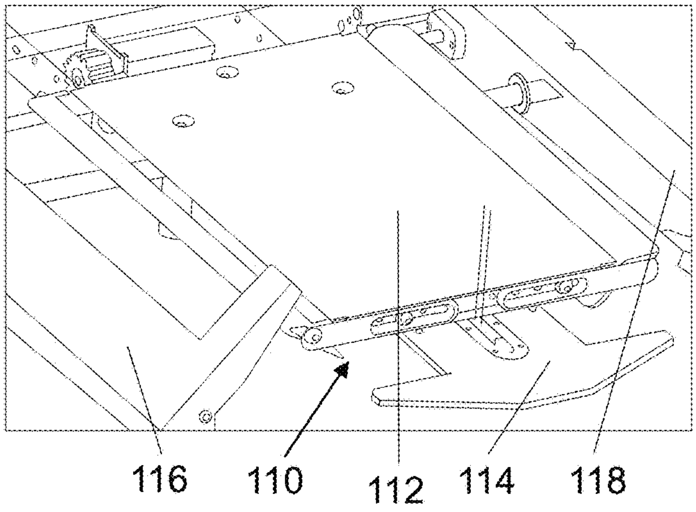
FIGS. 7A to 7C are three simplified views showing an adjustable pallet according to a second embodiment of the present invention in three different states of adjustment.
Figure 7B:
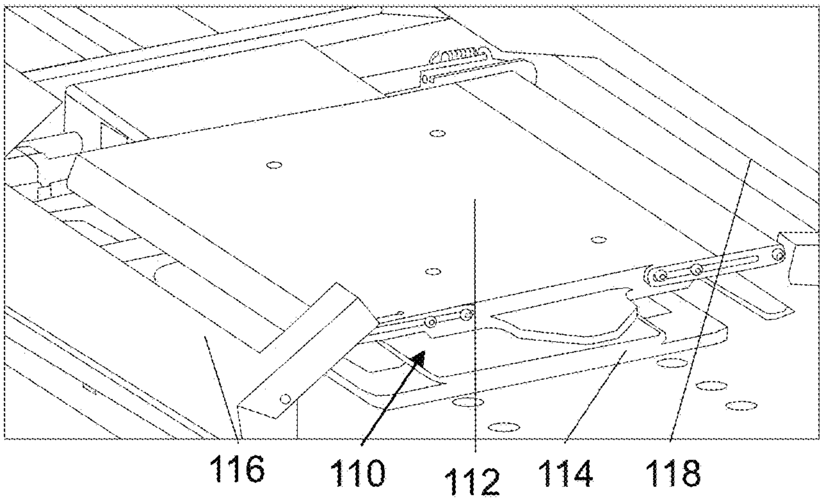
Figure 7C:
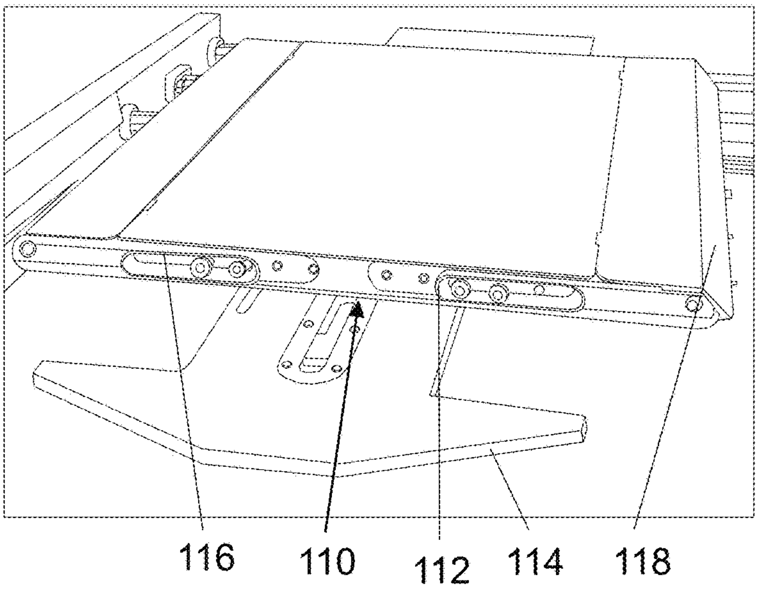

Reference is now made to FIGS. 7A to 7C which illustrate three positions of a multi-size pallet according to a second embodiment of the present invention. A central pallet portion 110 has a flat upper surface 112 and a sliding collar 114 and forms a full pallet of a smaller size as shown in FIG. 7A. Side wings 116 and 118 are rotated away from the central pallet and not in contact, so that shirts may be loaded directly onto the central pallet.

When a larger pallet is required, the outer wings 116 and 118 are rotated into the central pallet and engage the edges thereof as shown in FIG. 7B. FIG. 7C shows the final position in which the outer wings are fully engaged with the central pallet to form a contiguous surface of larger size. At the same time, sliding collar 14 slides outwards to give an enlarged collar.

The solution solves the issue of obtaining a multi size pallet. The action of revolving each triangle alters the width of the printing surface.

Figure 8A:
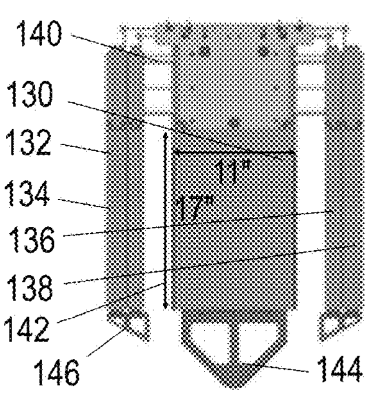
FIGS. 8A to 8C are simplified views showing an adjustable pallet according to a third embodiment of the present invention in three different states of adjustment.
Figure 8B:
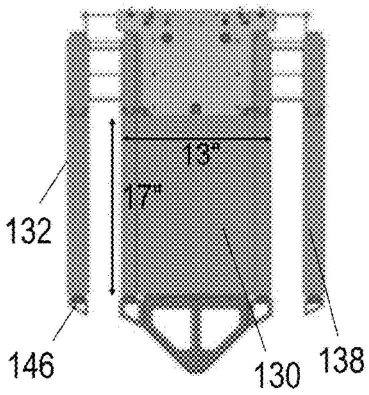
Figure 8C:
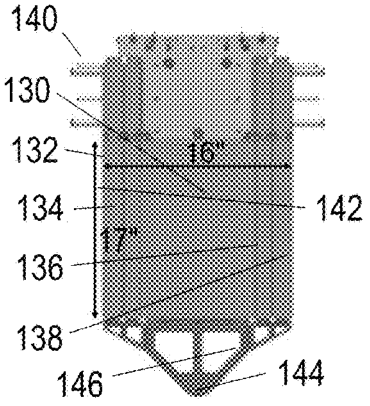

Reference is now made to FIGS. 8A to 8C, which are simplified views of a further embodiment of the present invention in which a basic platen 130 has one or more outer arms 132, 134, 136, 138 that may slide into position along sliders 140 to engage the basic platen and increase the printing width. The sliders 140 are at a distance 142 from collar 144 so that shirts and blouses etc may be freely inserted onto the pallet. FIG. 8A shows the minimal width, with basic platen 130 on its own and all of the arms 132, 134, 136 and 138 withdrawn. FIG. 8B shows an intermediate size in which outer arms 132 and 138 are withdrawn and inner arms 134 and 136 are engaged with the central platen 130. In FIG. 8C all four arms are engaged with the central platen 130 to form the standard width. The arms may each include extension parts 146 for the collar 144, so that as more of the arms are engaged the collar is enlarged.

Figure 9A:
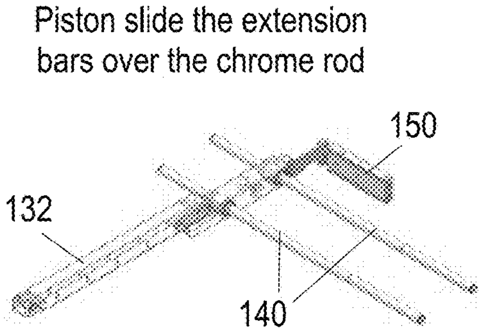
FIGS. 9A and 9B are two views showing mechanical features added to the pallet to achieve the adjustments shown in FIGS. 8A to 8C.
Figure 9B:
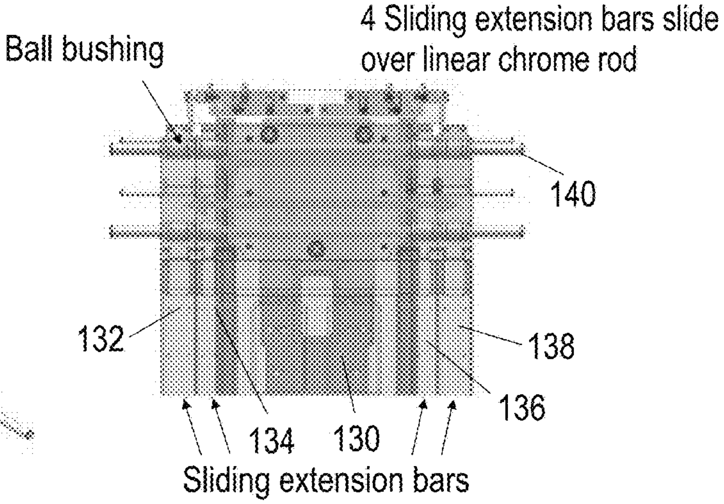

FIGS. 9A and 9B show in greater detail the sliders. The sliders 140 comprise rods which slot into the outer arms. Pistons 150 slide the outer arms back and forth over the sliders. The pistons may be operated using a stepper motor.

The solution solves the issue of obtaining a multi size pallet while attaining a simple stretching effect using the extension segments of the pallet. The action of modifying to the correct size of the pallet and the action of the stretching is done at the same move.

Figure 10A:
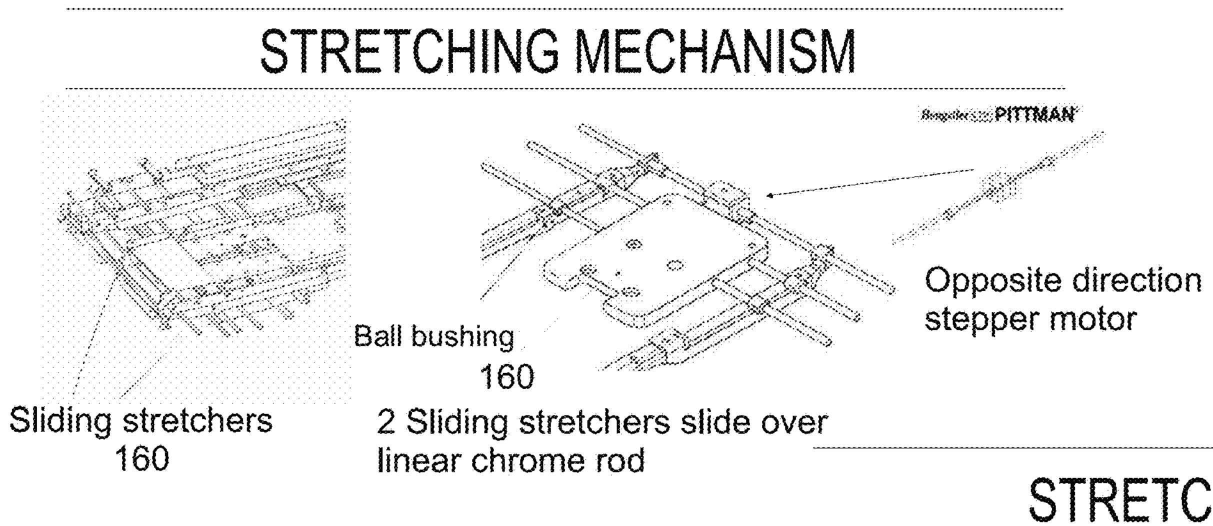
FIGS. 10A and 10B illustrate the stretching mechanism associated with the embodiment of FIGS. 8A to 8C.
Figure 10B:
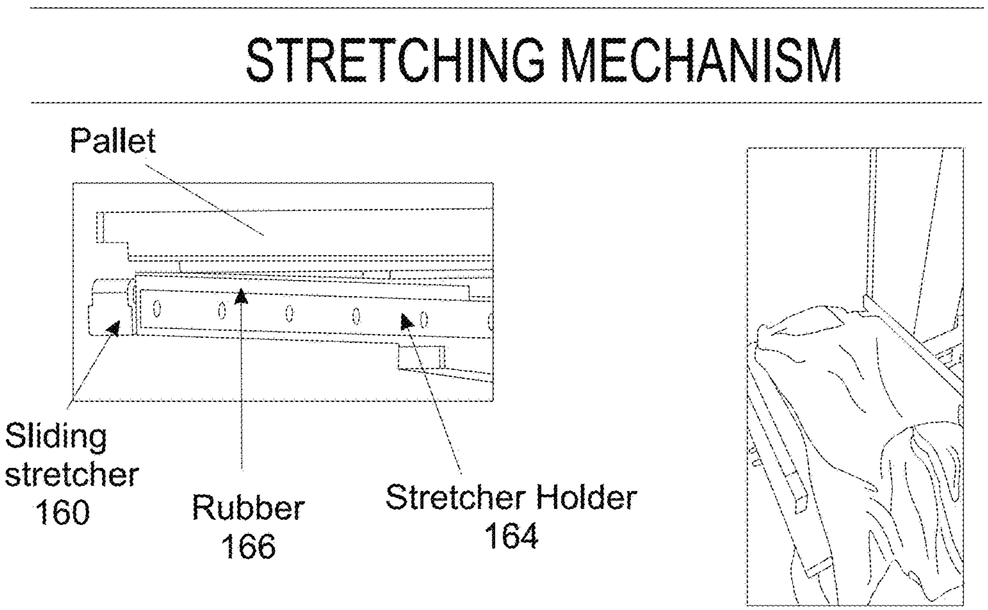

Reference is now made to FIG. 10A which illustrates a stretching mechanism for stretching a garment mounted on the pallet of FIGS. 8A to 8B. As shown in FIG. 10A sliding stretchers 160 slide on the rods 140 to stretch the garment from underneath. The stretchers slide over the rod under the influence of stepper motor 162 which pulls them outwardly from either side. The stretchers 160 are held in place by stretcher holders 164 and include a layer 166 of rubber. The stretchers 160 slide underneath any size of the pallet to stretch the garment from below so as to tension and thus flatten the upper face of the garment for printing. The action of modifying to the correct size of the pallet and the action of stretching are done as part of the same mechanism.

Figure 11A:
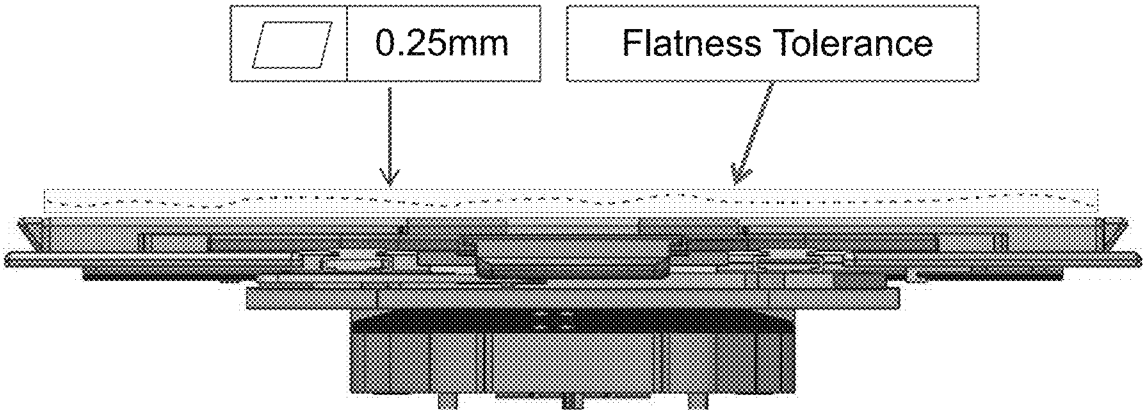
FIG. 11A illustrates the flatness tolerance encompassed by the present embodiments.
Figure 11B:
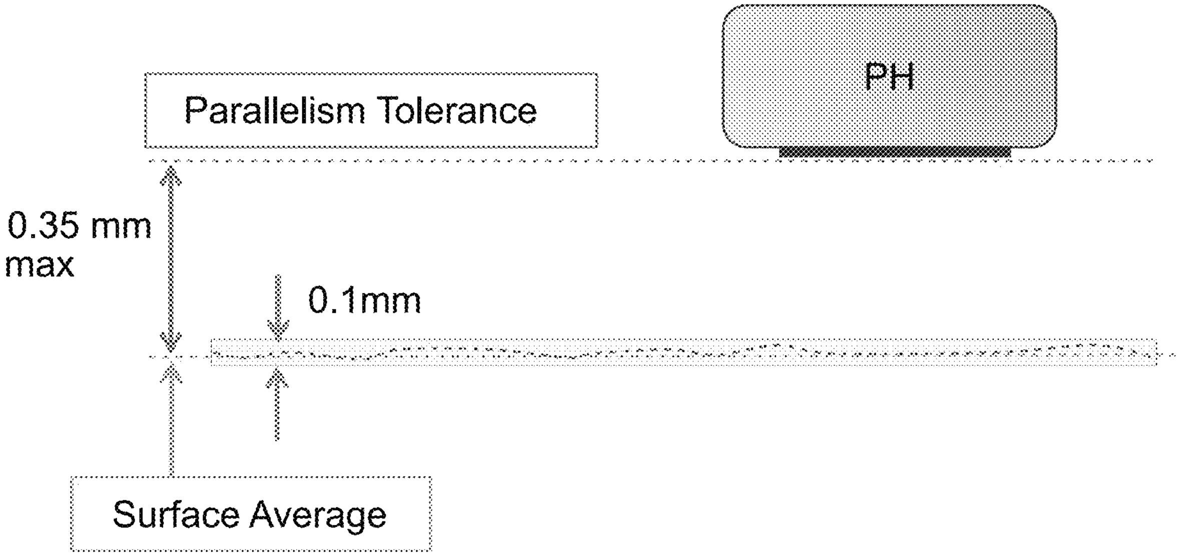
FIG. 11B is a simplified diagram illustrating the parallelism tolerance encompassed by the present embodiments.

Reference is now made to FIG. 11A, which is a simplified diagram illustrating the levels of flatness tolerance that may be required of a platen for digital printing. FIG. 11B is a simplified diagram showing the parallelism tolerance required of a platen for digital printing. The flatness tolerance for print head 170 is 0.25 mm over the length of the platen. The maximum delta for distance of the surface from the printhead 172 is 0.1 mm, with a maximum spacing between the print head and the garment surface of 0.35 mm.

Figure 12:
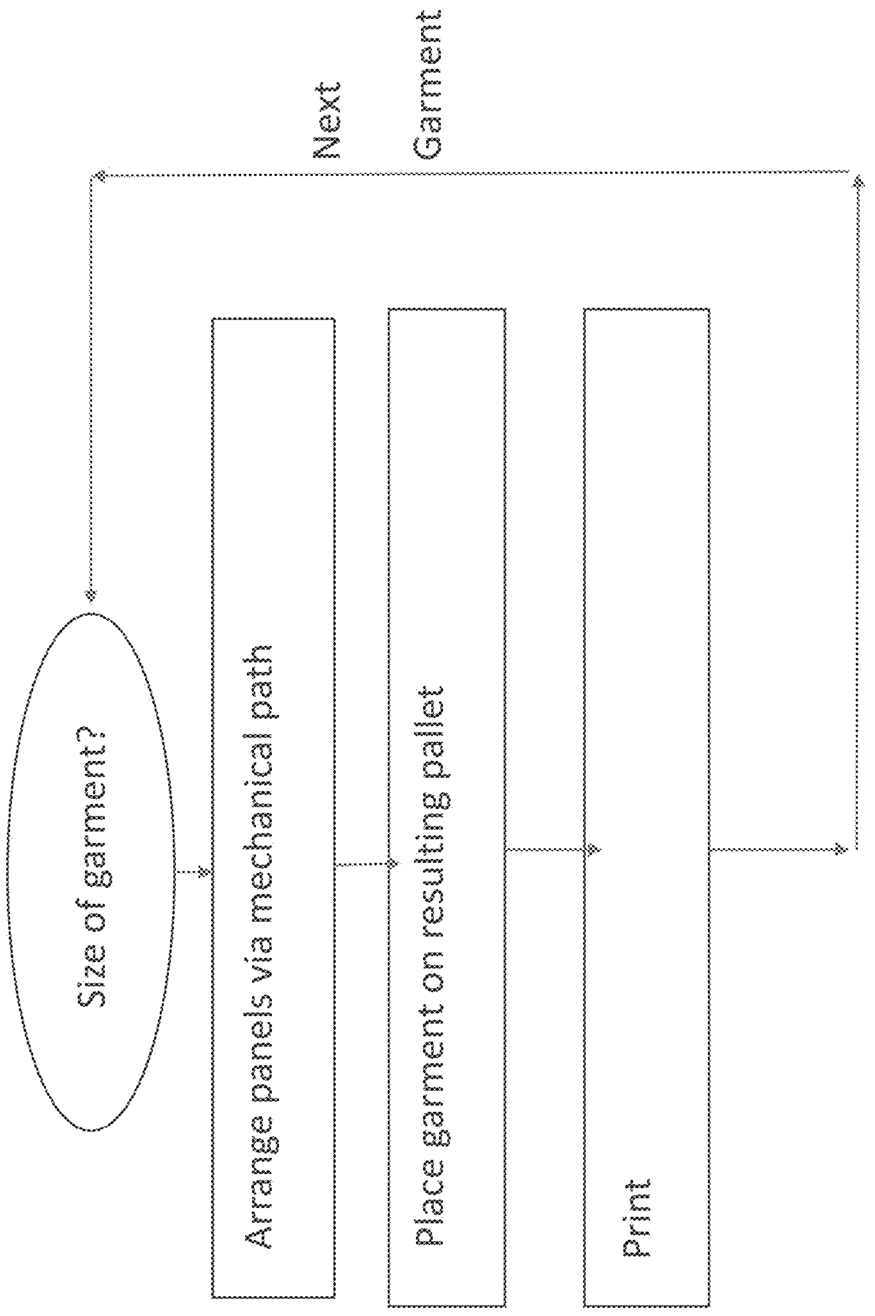
FIG. 12 is a simplified flow chart illustrating a process of carrying out printing with different sized garments and using an adjustable pallet according to embodiments of the present invention.

Reference is now made to FIG. 12, which is a simplified diagram illustrating a method of using a printing pallet according to embodiments of the present invention. The method consists of initially obtaining 180 a first size of a first garment to be printed. The size may be fed in by an operator or may be obtained electronically or may be supplied with the print map or may even be read from a bar code on the garment itself.

Once the size is known then panels may be moved together or apart 182 via defined mechanical paths to form a flat surface for a printing pallet which flat surface is the appropriate size for the garment being printed. The garment may then be slid 184 onto the pallet and printed 186. Then the process may be repeated with the next garment, the pallet size being modified for each garment or batch of garments.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment and the present description is to be construed as if such embodiments are explicitly set forth herein. Conversely, various features of the invention, which are, for brevity, described in the context of a single embodiment, may also be provided separately or in any suitable subcombination or may be suitable as a modification for any other described embodiment of the invention and the present description is to be construed as if such separate embodiments, subcombinations and modified embodiments are explicitly set forth herein. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. An adjustable pallet for digital printing comprising:

a flat printing surface having a flatness tolerance and/or a parallelism tolerance, the printing surface formed by at least two separable portions, which portions are configured to separate and re-engage while retaining said flatness tolerance and/or said parallelism tolerance, comprising at least one mechanical path through which said at least two separable portions are guided to allow for said separating and reengaging, said at least one mechanical path comprising linear paths, there being at least three separable portions, at least two being linearly slidable in a plane of said flat printing surface and at least one of said separable portions being slidable perpendicularly from said flat printing surface, said separable portions comprising at least two outer portions being slidable in said plane and inner portions being slidable perpendicularly, said inner portions being configured to slide underneath said outer portions to form a relatively smaller pallet and to emerge to form a contiguous surface with said outer portions to produce a relatively larger pallet.

2. The adjustable pallet of claim 1, wherein said flatness tolerance is less than 1 mm and/or said parallelism tolerance is less than 0.25 mm.

3. The adjustable pallet of claim 1, wherein said flatness tolerance is 0.25 mm and/or said parallelism tolerance is 0.1 mm.

4. The adjustable pallet of claim 1, wherein said mechanical path is a rotary path, there being at least three separable portions of which one is stationary and the other two are rotatable.

5. The adjustable pallet of claim 1, wherein said mechanical path is linear, there being at least three separable portions, of which one is stationary and the other two are linearly slidable.

6. The adjustable pallet of claim 1, wherein said inner portion comprises a central part and two surrounding portions, the central part configured to slide independently of said surrounding portions, thereby to form a relatively large pallet with outer portions, said inner part and said surrounding portions, a relatively medium pallet with said outer portions and said central part and a relatively small pallet with said outer portions only.

7. The adjustable pallet of claim 1, wherein said separable portions are pushed together by action of tensioning means.

8. The adjustable pallet of claim 1, wherein said separable portions comprise pins and corresponding sockets for location with each other.

9. The adjustable pallet of claim 1, the pallet having a collar end over which garments are slid onto the pallet, and sliders for sliding said separable portions, wherein said sliders are at a distance from said collar end, which distance is at least a length of a largest garment for which said pallet is suited.

10. The adjustable pallet of claim 1, the pallet having a collar end over which garments are slid onto the pallet, and holders for holding said separable portions in position, wherein said holders contact said separable portions at a distance from said collar end, which distance is at least a length of a largest garment for which said pallet is suited.

11. The adjustable pallet of claim 1, further comprising a stretching element for stretching a garment from underneath said pallet, the stretching element being placed on a slider on which at least one of said separable portions is slidable.

12. A method of printing different sized garments comprising:

obtaining a first size of a first garment to be printed;

moving panels together or apart via defined mechanical paths to form a flat surface for a printing pallet, through which defined mechanical paths said at least two separable portions are guided to allow for said separating and reengaging, said mechanical paths comprising linear paths, there being at least three separable portions, at least two being linearly slidable in a plane of said flat surface and at least one of said separable portions being slidable perpendicularly from said flat surface, said separable portions comprising at least two outer portions being slidable in said plane and inner portions being slidable perpendicularly, said inner portions being configured to slide underneath said outer portions to form a relatively smaller pallet and to emerge to form a contiguous surface with said outer portions to produce a relatively larger pallet;

placing the garment on the printing pallet;

printing the garment;

obtaining a second size of a second garment to be printed;

if said second size is significantly different from said first size then rearranging said panels via said define mechanical paths to form a flat surface of an adjusted pallet suitable for said second size;

placing the second garment on the adjusted pallet; and printing the garment.

13. The adjustable pallet for digital printing of claim 1, wherein the printing surface is formed by at least two separable portions, which portions are configured to separate and re-engage using predefined mechanical paths, thereby retaining said flatness tolerance and/or said parallelism tolerance.

14. The adjustable pallet of claim 1, wherein said flat printing surface has both of said flatness tolerance and said parallelism tolerance.

15. The adjustable pallet of claim 1, comprising at least one motor configured to operate at least one actuator to guide any ones of said separable portions to allow for said separating and reengaging using said linear paths.

16. The adjustable pallet of claim 1, comprising wings being able to rotate away from and towards the pallet to hold the loaded garment firmly for printing.

* * * * *